United States Patent [19]

Palvölgyi

[11] Patent Number: 4,726,622
[45] Date of Patent: Feb. 23, 1988

[54] ONE-PIECE PAWL

[75] Inventor: Sandor Palvölgyi, Newmarket, Canada

[73] Assignee: Magna International Inc., Markham, Canada

[21] Appl. No.: 926,190

[22] Filed: Nov. 3, 1986

[30] Foreign Application Priority Data

Oct. 31, 1986 [CA] Canada .................................. 521955

[51] Int. Cl.⁴ ........................... A47C 1/00; B60N 1/04
[52] U.S. Cl. .................................................. 297/379
[58] Field of Search ...................... 297/379, 378, 354

[56] References Cited

U.S. PATENT DOCUMENTS

| 3,328,077 | 6/1967 | Krasinski | 297/379 |
| 4,132,447 | 1/1979 | Terada | 297/379 X |
| 4,206,946 | 6/1980 | Maertens | 297/379 |
| 4,318,569 | 3/1982 | Bilenchi et al. | |
| 4,365,838 | 12/1982 | Berg | |

FOREIGN PATENT DOCUMENTS

| 732435 | 4/1966 | Canada . | |
| 950819 | 7/1974 | Canada . | |
| 1116991 | 1/1982 | Canada . | |
| 1126638 | 6/1982 | Canada . | |
| 2708461 | 2/1977 | Fed. Rep. of Germany . | |
| 3316024 | 11/1984 | Fed. Rep. of Germany | 297/354 |
| 2556946 | 10/1983 | France . | |

Primary Examiner—Kenneth J. Dorner
Assistant Examiner—Peter R. Brown
Attorney, Agent, or Firm—Ivor M. Hughes

[57] ABSTRACT

An adjustable backrest latching mechanism pivotable in position in relation to a seat cushion from a locked upright position to a locked fully folded position, said latch mechanism comprising a backrest having a pivot pin and restraining bolt affixed thereto which cooperatively operate within, and are secured to, a pawl mechanism of singular construction affixed to a mounting frame, the pawl mechanism being pivotably releasable with respect to said restraining bolt of said backrest thereby locking the backrest forwardly when fully folded and upright in use, within recesses or notches disposed upon the perimeter of a generally J shaped channel stamped within the body of said pawl mechanism within which said restraining bolt rides.

4 Claims, 6 Drawing Figures

ONE-PIECE PAWL

FIELD OF THE INVENTION

This invention relates to a one piece pawl mechanism incorporated in a pivoting vehicle seat whereby the seat may be locked both in a fully upright position or a fully pivoted position.

BACKGROUND OF INVENTION

Many mechanisms have been prepared for allowing vehicle seats to pivot from a fully upright position allowing access to, for example, the back seat of an automobile. However most of these mechanisms are very complicated and require a great number of parts to operate successfully. Further with the emphasis on safety and economy many mechanisms have been proposed which reduce the number of parts and hence the risk of failure and usually the cost to manufacture such a mechanism. Finally many of the aforementioned devices may lock in position to reduce the risk of physically upsetting the passengers or operator of a vehicle in emergency situations due to for example, sudden braking or accidental situations resulting in rapid deceleration of the vehicle.

Canadian Letters Patent No. 732,435 teaches a purported simple and economical hinge fitting for adjustable backrests for vehicles, having two pairs of hinge parts, comprising a tooth segment, a rotatably mounted pinion, a toothed wheel, a locking device, and a locking lever.

Canadian Letters Patent No. 950,819 teaches a vehicle seat latch of relatively complicated structure for maintaining a tiltable cushion back member of a vehicle seat structure in an upright position under conditions inducing inertially motivated tilting movement of said seat structure, having a latch bolt which captures a striker whenever the cushion back member is in an upright position and having a safety latch to assure the latch is secure under the aforementioned conditions.

U.S. Pat. No. 4,365,838, discloses an inertia seat back lock which latches a tiltable seat normally in a fully upright position and prevents significant forward movement of the seat back when being subjected to rapid deceleration forces.

U.S. Pat. No. 4,318,569 discloses a seat back latch mechanism, having a pivotally mounted pawl arranged so that its center of gravity is such that the seat back will tilt when urged to do so by a vehicle occupant. When the vehicle is subject to rapid deceleration the pawl engages a detent to prevent tilting of the backrest structure.

German Patent No. 2,708,461 teaches a Safety catch for an adjustable car seat having an inertial ratchet to lock the backrest joint in such as a collision.

Canadian Letters Patent Nos. 1,116,991 and 1,126,638 teach together, a reclining and emergency latch mechanism for vehicle seats which positively latches the seat back against undesired rearward and forward pivotal movement, said latch mechanism being infinitely adjustable and of simple a construction; said latch comprising a first and second disc shaped clutch quadrant having first and second parallel flat faces for rotation relative to the seat cushion, being secured in various positions by a latch dog pin having a pair of latch dogs secured to the seat cushion. This structure incorporates several pins, pivots, and co-operating shoulders and edges to operate efficiently and is more complicated in structure than the invention at hand.

French Patent No. 2556946 assigned to Sablé Matra illustrates in FIG. 2 a seat latching mechanism more complicated in structure than the instant invention but having similar attributes.

It is therefore an object of this invention to simplify the structure of seat latch mechanisms by substantially reducing the number of components thereof and yet retaining all of the essential functions therein.

It is a further object of this invention to provide a structure which is economical to produce and simple and cost-effective to install.

It is still a further object of this invention to provide a latch mechanism that will lock forwardly and rearwardly.

Further and other objects of this invention will become apparent to a man skilled in the art when considering the following summary of the invention and the more detailed embodients of the invention illustrated herein.

SUMMARY OF THE INVENTION

According to one aspect of the invention an adjustable backrest latching mechanism pivotable in position in relation to a seat cushion from a locked upright position to a locked fully folded position is provided, said latching mechanism, comprising a pivot pin and restraining bolt secured to a backrest, the pivot pin centrally secured to upon the lateral edge of the backrest proximate the seat cushion and extending horizontally away from said backrest upon which said backrest pivots, the restraining bolt offset from and parallel to the extension of said pivot and affixed to the lateral edge of the back rest; having a mounting member for securing the backrest to a seat frame by said pivot pin; having a resiliently biased generally arcuate detent mechanism which both locks and releasably engages the restraining bolt of the backrest at all times; the resiliently biased generally arcuate detent mechanism comprising a singular planar member extending primarily vertically in a plane parallel to that of the extension of said mounting member, having a top and bottom, and having disposed upon one side remote a seat cushion an offset pivot affixed to said mounting member upon which said detent mechanism rotates, and having disposed upon its other side at the top thereof proximate the seat cushion, an operator actuated lever extending laterally away from the detent mechanism (preferably generally parallel to the direction of extension of said seat cushion) and having disposed upon the same side as said lever an elogated arcuate slot through which the pivot pin of said backrest passes to be affixed to said mounting member; and having commencing at its top and extending general from top to bottom a centrally positioned generally arcuate J shaped channel having restraining notches, the J shaped channel intermediate the offset pivot and said operator actuated lever, in which said restraining bolt of said backrest rides, whereby when the backrest is pivoted to a locking position of said restraining bolt within restraining notches top and bottom of the generally arcuate J shaped channel, said notches for locking the backrest in position, the generally arcuate J shaped channel for guiding the restraining bolt within said channel to position said restraining bolt within said notches, said pawl mechanism thereby secures the backrest in a locked position yet allows pivoting of the backrest between a fully upright locked position and a generally horizontal fully pivoted locked position via actuation of the operator actuated lever and the appropriate positioning of said backrest.

According to another aspect of the invention for use with a pivoting backrest having a pivot pin centrally secured thereto upon the lateral edge thereof and offset from a restraining bolt secured thereto upon the same lateral edge thereof, a resiliently biased pawl mechanism is provided comprising a singular planar member extending primarily vertically in a plane parallel to that of the extension of a mounting bracket to which said pawl mechanism is pivotably secured, said pawl mechanism having a top and bottom and having disposed upon one side remote a seat cushion, an offset pivot affixed to said mounting member upon which said pawl mechanism rotates and having disposed upon its other side at the top thereof proximate said seat cushion, an operator actuated lever extending laterally away from the pawl mechanism and having disposed upon the same side as the lever an elongated slot through which the pivot pin of said backrest passes to be affixed to said mounting member, and having commencing at its top and extending generally from top to bottom a centrally positioned generally arcuate J shaped channel having restraining notches, the J shaped channel intermediate the offset pivot and the operator actuated lever in which said restraining bolt of the backrest rides, whereby when said backrest is pivoted to a locking position of said restraining bolt within restraining notches top and bottom of the generally arcuate J shaped channel, said notches for locking the backrest in position, said pawl mechanism thereby secures the backrest in a locked position yet allows pivoting of the backrest between a fully upright locked position to a generally horizontal fully pivoted locked position via actuation of the operator actuated lever and the appropriate positioning of said backrest.

According to yet another aspect of the invention a resiliently biased generally U shaped one piece pawl is provided, said pawl comprising a singular planar member extending primarily vertically in use in a plane parallel to that of a lateral edge of a backrest, said pawl having a top and bottom and having centrally disposed upon one arm of the U shaped pawl, a pivot pin recess for receiving a pivot pin for anchoring the pawl to a frame upon which said pawl rotates, and having disposed upon the other arm of the U shaped pawl at the top thereof a lever extending laterally away from said pawl, and having an elongated slot extending vertically, generally in the direction of extension of the same arm proximate said lever through which a pivot pin for a backrest extends, said pin being anchored to the same frame to which the pawl pivot is connected; having generally disposed intermediate the two arms of the generally U shaped one piece pawl a downwardly extending generally J shaped channel within which a restraining bolt travels, said restraining bolt being secured to the same backrest to which the pivot pin is secured, said channel having a notch at the bottom thereof proximate the arm of the U shaped pawl having the elongated slot, said notch extending upwardly from the bottom of said generally J shaped channel, said channel also having a recess at the top thereof upon the interior perimeter of the arm having the centrally disposed pivot pin of the pawl said recess and said notch for locking a restraining bolt affixed to a backrest therein; the one piece generally U shaped pawl being pivotably securable to a frame by the centrally disposed pivot pin upon one arm of the generally U shaped pawl, said pawl being resiliently biased proximate the elongated slot to be urged downwardly, whereby when the frame carries a pin secured within the elongated slot upon which a backrest pivots, and a restraining bolt is provided affixed to a backrest for engagement within the generally J shaped channel and for locking top and bottom within the recess and the notch thereof:

(a) with the pawl latched in the notch by said restraining bolt affixed to a backrest, as the lever upon the arm of the generally U shaped pawl proximate the elongated slot is pivoted upwardly, the pin upon which a backrest pivots carried within said slot moves downwardly within said slot, and the restraining bolt provided for engagement within the generally J shaped channel is released from the notch at the bottom of the J shaped channel, the restraining bolt is guided to travel within said generally J shaped channel thereby permitting both pivot pins which are secured to said frame to pivot with respect to one another from an upright locked position of a backrest to a fully forward pivoted and locked position of said backrest and (b) with the pawl latched by the recess by the restraining bolt affixed to a backrest, as the lever upon the arm of the generally U shaped pawl proximate the elongated slot is pushed upwardly, the pin upon which a backrest pivots carried within said slot moves downwardly within said slot, and the restraining bolt provided for engagement with the generally J shaped channel is released from the recess at the top of the arm upon which the centrally disposed pivot pin is positioned, the restraining bolt is unrestricted to travel within said generally J shaped channel thereby permitting both pins which are secured to said frame to pivot with respect to one another from a fully forward pivoted locked position of a backrest to an upright locked position of said backrest.

DETAILED DESCRIPTION OF THE DRAWINGS

Figure 1:
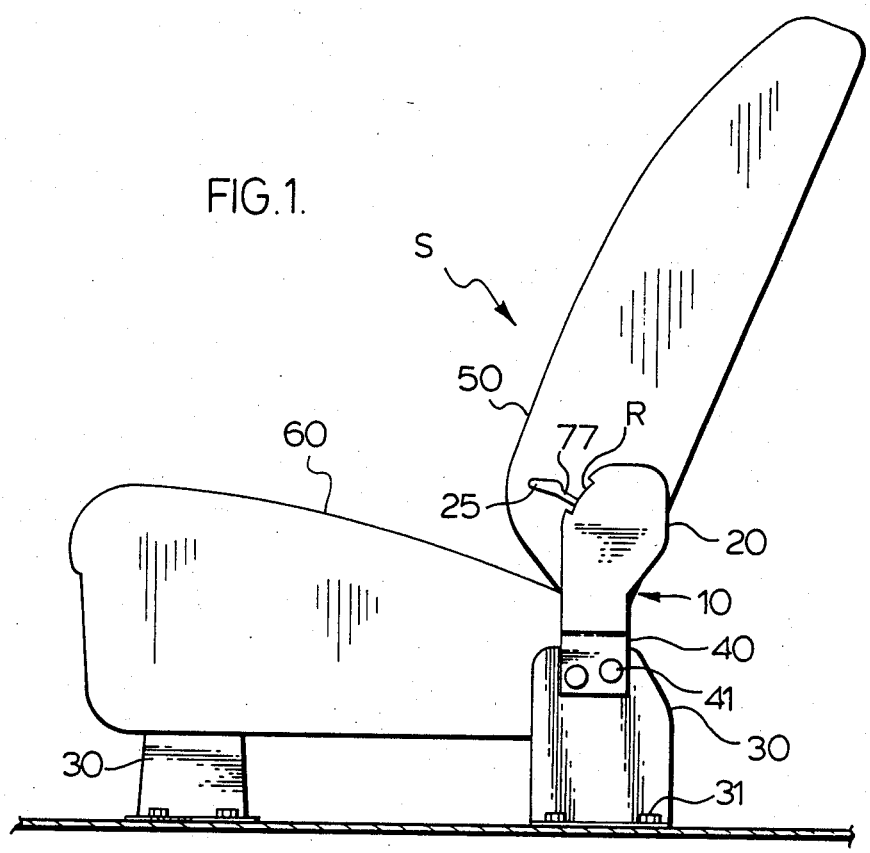
FIG. 1 is a side view of a seat illustrating the location of the latch mechanism in a preferred embodiment of the invention.

Referring to FIG. 1 vehicle seat S is illustrated having seat cushion 60 and pivotable backrest 50 whereby seat cushion 60 is attached to the vehicle floor forwardly and rearwardly by frame 30 at fasteners 31, and backrest 50 is also attached to frame 30 at fasteners 41 by U shaped member 40 affixed to latch mechanism 10. Seat back 50 is pivotable with respect to seat cushion 60 from a locked upright position as best illustrated in FIG.

Figure 6:
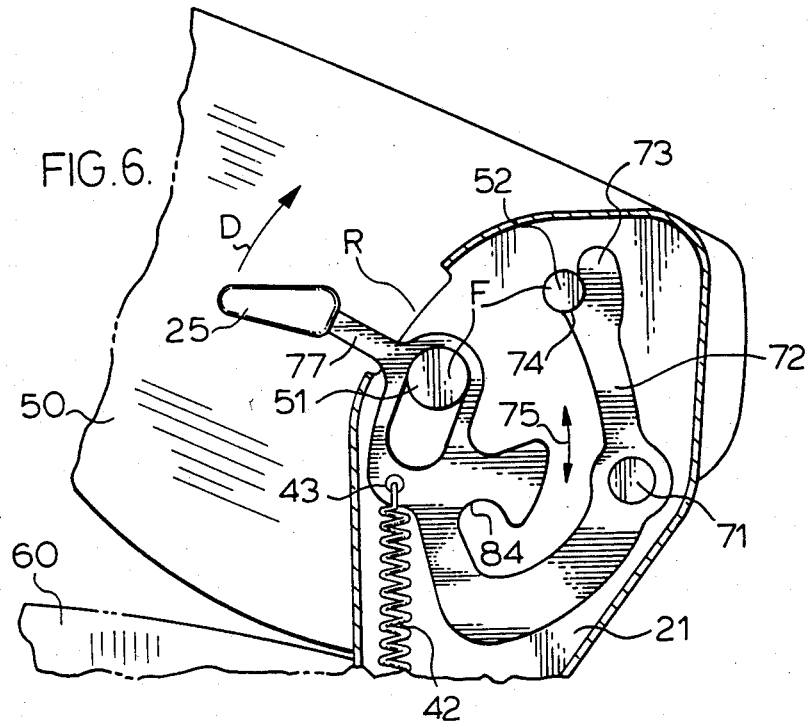
FIG. 6 is a continuation from FIG. 5 illustrating the forward pivoting of the seat back to a forward latching position in a preferred embodiment of the invention.

2 to a locked fully forward pivoting position as best illustrated in FIG. 6, upon actuation of release lever handle 25 of latch mechanism 10 having cover 20 with recess R within which release lever 77 rotates in use.

Figure 2:
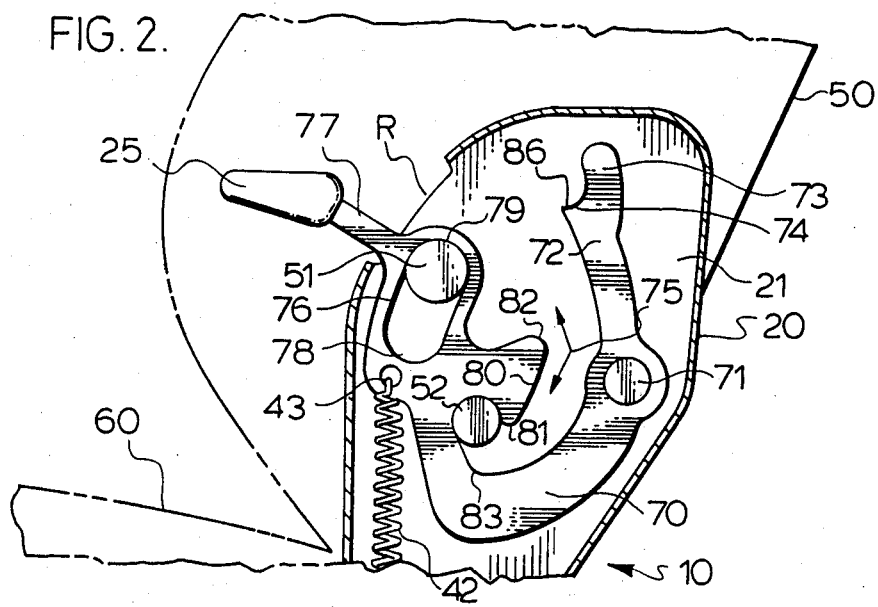
FIG. 2 is a close up view of the latch mechanism of FIG. 1 in a embodiment of the invention.
Figure 3:
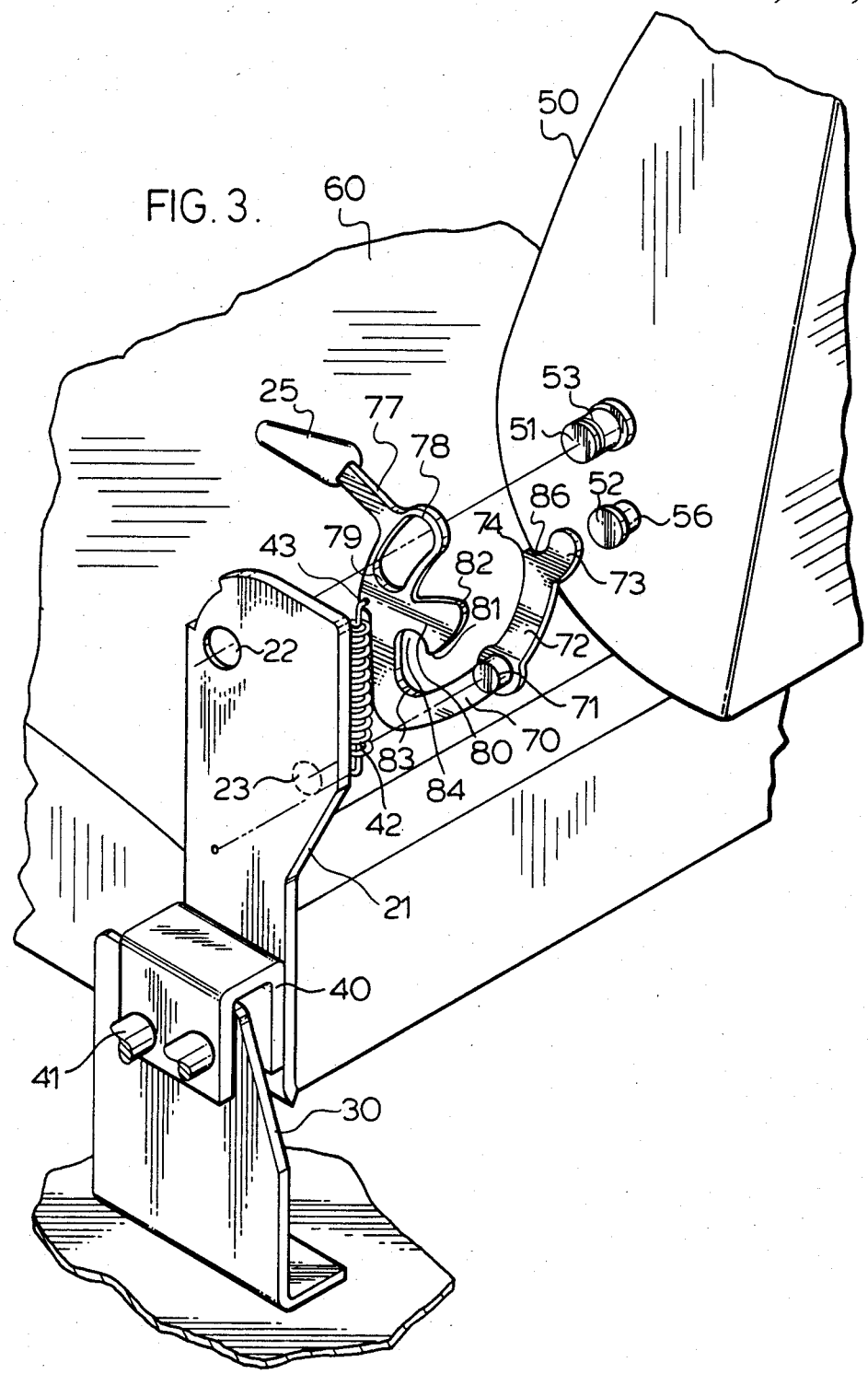
FIG. 3 is a perspective view of the latch mechanism of FIG. 2 exploded to illustrate all the separate components thereof in a preferred embodiment of the invention.

Referring now to FIGS. 2 and 3, latch mechanism 10 is illustrated in relation to backrest 50. Backrest 50 has secured to it's lateral edge near the bottom, centrally located pivot pin 51 having below and offset thereto restraining bolt 52, both extending horizontally away from the lateral edge of said backrest. Pivot pin 51 is centrally located upon the bottom lateral edge of backrest 50 said pin having a recessed arcuate groove 53 and extending through elongated slot 76 of pawl mechanism 70, the peripheral edges of said slot riding in said arcuate groove 53 of said pin 51 said pin further extending through orifice 22 of mounting bracket 21, thereby pivotably securing said backrest 50 in relation to said seat cushion and said pawl mechanism 70.

Arcuate pawl mechanism 70 is generally U shaped being formed of a singular member and having two arms 72, and 80 extending upwardly away from point 83 and having a top and bottom and having centrally located upon one side pivot pin 71 fastened through mounting bracket 21 at hole 23, about which pawl 70 rotates when actuated and having upon the other side at the top thereof proximate elongated slot 76, release lever 77, extending in a direction generally parallel to seat cushion 60 having affixed at the end thereof handle 25.

Centrally located, intermediate said pivot 71 and said elongated slot 76 extending generally from top to bottom, is generally J shaped channel 75 bounded by the interior of upwardly extending arms 72 and 80 within which said channel restraining bolt 52 rides, said restraining bolt having and end 56 of enlarged diameter which contains restraining bolt 51 within J shaped channel 75 of pawl 70, said pawl resiliently biased about pivot 71 by spring 42 secured at its top to hole 43 located below and adjacent elongated slot 76 and extending through said pawl, and upon its bottom (not shown) to mounting bracket 21.

Generally J shaped channel 75 has disposed upon its bottom adjacent the interior of arm 80 a notch 84 said recess bounded on the side proximate the channel by downwardly extending lobe 81 within which restraining bolt 52 is locked when backrest 50 is in an upright position. Upwardly extending arm 72 has upon its top 73 recess 86 proximate the top of said J shaped channel within which restraining bolt 52 locks upon edge 74 within recess 86 when backrest 50 is fully forwardly pivoted and locked forwardly.

Figure 4:
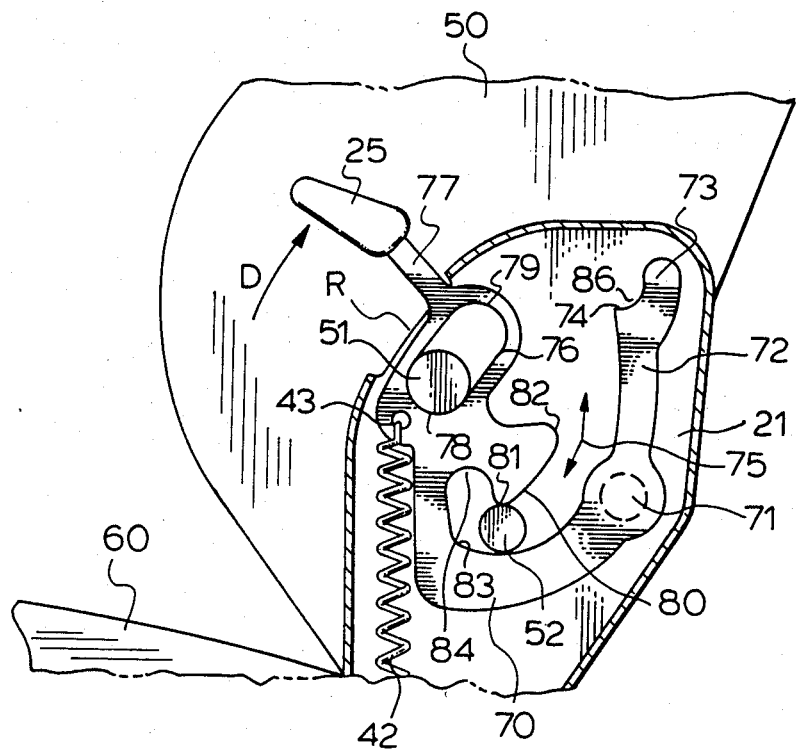
FIG. 4 is a close-up view of the latch mechanism as in FIG. 2 illustrating the release of the seat back in a preferred embodiment of the invention.
Figure 5:
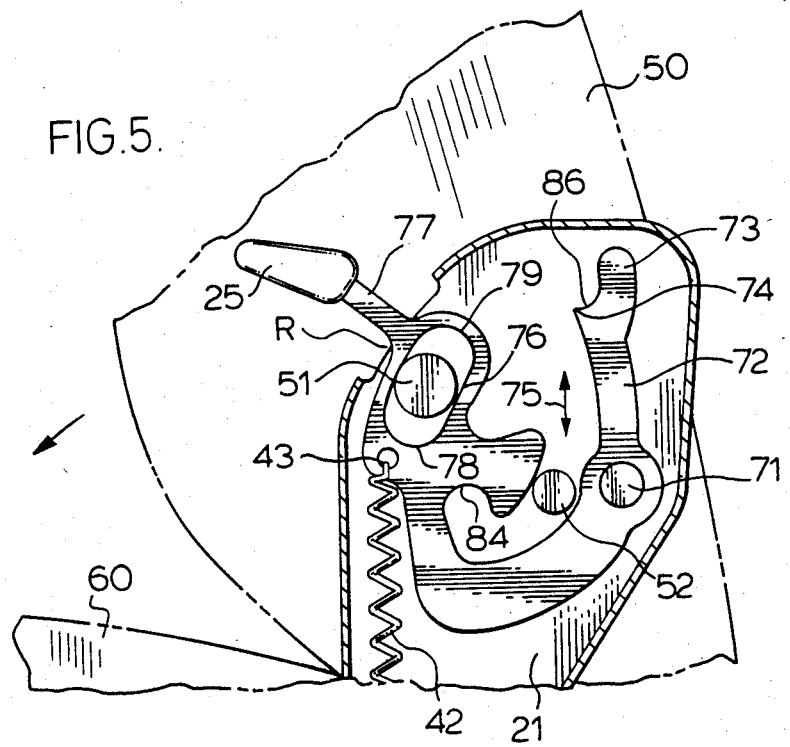
FIG. 5 is a continuation from FIG. 4 illustrating the pivoting function of the latch mechanism in a preferred embodiment of the invention.

Referring now to FIGS. 4, 5 and 6, latch mechanism 10 is illustrated depicting the position of the components thereof while backrest 50 is being released and pivoted from a locked upright position through a locked forwardly pivoted position. In order to accomplish this task handle 25 attached to lever 77 is rotated in a clockwise direction thereby causing pivot pin 51 to pass from the top 79 of elongated slot 76 to bottom 78 of said slot as the entire pawl mechanism 70 rotates in said direction D. Restraining bolt 52 as a result of such a rotation of pawl 70 about pivot 71 is released from notch 84 (as shown in FIG. 4) and is free to move within channel 75 along the arcuate path of channel 75, (as shown in FIG. 5) said channel path being defined by the arcuate path of restraining bolt 52 about central pivot pin 51 at radius F which remains constant at all times as backrest 50 is rotated, until such point as restraining bolt 52 and backrest 50 are rotated to their most forwardly rotated position whereafter restraining bolt 52 is locked within recess 86 of arm 72 by surface 74.

Referring now to FIG. 6 wherein backrest 50 is locked fully forward by restraining bolt 52 secured within recess 86 upon top arm 73 of pawl 70. Lever 25 is actuated in direction D by the user, thereby causing pawl 70 to rotate in a clockwise direction about pivot 71 tensioning spring 42 and rotating notch 86 downwardly out of communication with restraining bolt 52 which thereafter upon rotation of backrest 50 causes said restraining bolt to travel an arcuate path as it rides within J shaped channel 75 from top to bottom until recess 84 is reached where said restraining bolt is locked within recess 84, once backrest 50 is upright, and resiliently biased pawl 70 returns via spring 42 to its upright posture.

The centre of mass of the pawl mechanism 70 passes through a horizontal line bisecting pivot 71, whereby if a rapid deceleration occurs in such as an automobile accident no resulting force to cause pawl 70 to rotate will result, thereby ensuring restraining bolt 52 remainirg locked in recess 84 and hence backrest 50 from persuading the seat occupant in an undesirable direction.

If resilient biasing means 42 should break the design of the pawl mechanism 70 in such that the majority of the weight of the pawl is to the side of the pivot proximate the lever 77 which will ensure that restraining bolt 52 is maintained in a locked position, precluding accidental release.

Elongated slot 76 of pawl 70 allows pivot pin 51 of backrest 50 to remain captured at all times within said elongated slot and thereby establishes the position of restraining bolt 52 depending on whether pivot pin 51 of backrest 50 is situated adjacent point 79 or point 78.

Pawl 70 is primarily U shaped to prevent it from binding against cover 20 upon rotation of said pawl about pivot 71.

As many changes can be made to the preferred embodiments without departing from the scope of the invention, it is intended that all matter contained herein be interpreted as illustrative of the invention and not in a limiting sense.

The embodiments of the invention in which an exclusive property or privilege is claimed are as follows:

1. An adjustable backrest latching mechanism pivotable in position in relation to a seat cushion from a locked upright position to a locked fully folded position, said latching mechanism comprising a pivot pin and restraining bolt secured to a backrest, the pivot pin centrally secured upon the lateral edge of the backrest proximate the seat cushion and extending horizontally away from said backrest upon which said backrest pivots, the restraining bolt offset from and parallel to the extension of said pivot and affixed to the lateral edge of the back rest; having a mounting member for securing the backrest to a seat frame by said pivot pin; having a resiliently biased generally arcuate detent mechanism which both locks and releasably engages the restraining bolt of the backrest at all times; the resiliently biased generally arcuate detent mechanism comprising a singular planar member extending primarily vertically in a plane parallel to that of the extension of said mounting member, having a top and bottom, and having disposed upon one side remote a seat cushion an offset pivot affixed to said mounting member upon which said detent mechanism rotates, and having disposed upon its other side at the top thereof proximate the seat cushion, an operator actuated lever extending laterally away from the detent mechanism and having disposed upon the same side as said lever an elongated arcuate slot through which the pivot pin of said backrest passes to be afixed to said mounting member; and having commencing at its top and extending generally from top to bottom a centrally positioned generally arcuate J shaped channel having restraining notches, the J shaped channel intermediate the offset pivot and said operator actuator lever, in which said restraining bolt of said backrest rides, whereby when the backrest is pivoted to a locking position of said restraining bolt within restraining notches top and bottom of the generally arcuate J shaped channel, said notches for locking the backrest in position, the generally arcuate J shaped channel for guiding the restraining bolt within said channel to position said restraining bolt within said notches, said pawl mechanism thereby secures yet allows pivoting of the backrest between a fully upright locked position and a generally horizontal fully pivoted locked position via actuation of the operator actuated lever and the appropriate positioning of said backrest.

2. The mechamism of claim 1, wherein the operator actuated lever extends generally parallel to the direction of extension of said seat cushion.

3. Within a pivoting backrest, having a pivot pin centrally secured thereto upon the lateral edge thereof and offset from a restraining bolt secured thereto upon the same lateral edge thereof, a resiliently biased pawl mechanism comprising a singular planar member extending primarily vertically in a plane parallel to that of the extension of a mounting bracket to which said pawl mechanism is pivotably secured, said pawl mechanism having a top and bottom and having disposed upon one side remote to seat cushion, an offset pivot affixed to said mounting member upon which said pawl mechanism rotates and having disposed upon its other side at the top thereof proximate said seat cushion, an operator actuated lever extending laterally away from the pawl mechanism and having disposed upon the same side as the lever an elongated slot through which the pivot pin of said backrest passes to be affixed to said mounting member, and having commencing at its top and extending generally from top to bottom a centrally positioned generally arcuate J shaped channel having restraining notches, and J shaped channel intermediate the offset pivot and the operator actuated lever in which said restraining bolt of the backrest rides, whereby when said backrest is pivoted to a locking position of said restraining bolt within restraining notches top and bottom of the generally arcuate J shaped channel, said notches for locking the backrest in position, said pawl mechanism thereby secures the backrest in a locked position yet allows pivoting of the backrest between a fully upright locked position and a generally horizontal fully pivoted locked position via actuation of the operator actuated level and the appropriate positioning of said backrest.

4. A resiliently biased generally U shaped one piece pawl, said pawl comprising a singular planar member extending primarily vertically in use in a plane parallel to that of a lateral edge of a backrest, said pawl having a top and bottom and having centrally disposed upon one arm of the U shaped pawl, a pivot pin recess for receiving a pivot pin for anchoring the pawl to a frame upon which said pawl rotates, and having disposed upon the other arm of the U shaped pawl at the top thereof a lever extending laterally away from said pawl, and having an elongated slot extending vertically, generally in the direction of extension of the same arm proximate said lever through which a pivot pin for a backrest extends, said pin being anchored to the same frame to which the pawl pivot is connected; having generally disposed intermediate the two arms of the generally U shaped one piece pawl a downwardly extending generally J shaped channel within which a restraining bolt travels, said restraining bolt being secured to the same backrest to which the pivot pin is secured, said channel having a notch at the bottom thereof proximate the arm of the U shaped pawl having the elongated slot, said notch extending upwardly from the bottom of said generally J shaped channel, said channel also having a recess at the top thereof upon the interior perimeter of the arm having the centrally disposed pivot pin of the pawl said recess and said notch for locking a restraining bolt affixed to a backrest therein; the one piece generally U shaped pawl being pivotably securable to a frame by the centrally disposed pivot pin upon one arm of the generally U shaped pawl, said pawl being resiliently biased proximate the elongated slot to be urged downwardly, whereby when the frame carries a pin secured within the elongated slot upon which a backrest pivots, and a restraining bolt is provided affixed to a backrest for engagement within the generally J shaped channel and for locking top and bottom within the recess and the notch thereof:

(a) with the pawl latched in the notch by said restraining bolt affixed to a backrest, as the lever upon the arm of the generally U shaped pawl proximate the elongated slot is pivoted upwardly, the pin upon which a backrest pivots carried within said slot moves downwardly within said slot, and the restraining bolt provided for engagement within the generally J shaped channel is released from the notch at the bottom of the J shaped channel, the restraining bolt is guided to travel within said generally J shaped channel thereby permitting both pivot pins which are secured to said frame to pivot with respect to one another from an upright locked position of a backrest to a fully forward pivoted and locked position of said backrest and (b) with the pawl latched by the recess by the restraining bolt affixed to a backrest, as the lever upon the arm of the generally U shaped pawl proximate the elongated slot is pushed upwardly, the pin upon which a backrest pivots carried within said slot moves downwardly within said slot, and the restraining bolt provided for engagement with the generally J shaped channel is released from the recess at the top of the arm upon which the centrally disposed pivot pin is positioned, the restraining bolt is unrestricted to travel within said generally J shaped channel thereby permitting both pins which are secured to said frame to pivot with respect to one another from a fully forward pivoted locked position of a backrest to an upright locked position of said backrest.

* * * * *

UNITED STATES PATENT AND TRADEMARK OFFICE
CERTIFICATE OF CORRECTION

PATENT NO. : 4,726,622

DATED : February 23, 1988

INVENTOR(S) : Sandor Palvolgyi

It is certified that error appears in the above-identified patent and that said Letters Patent is hereby corrected as shown below:

At column 2, line 52 at the beginning of that line before 'arcuate', "elogated" should be changed to ---elongated---;

At column 3, line 34 after 'locked position' and before 'a generally', "to" should be changed to ---and---;

At column 4, line 44 after 'in a' and before 'embodiment', ---preferred--- should be added;

At column 5, line 35 after 'bolt having' and before 'end 56', "and" should be changed to ---an---;

At column 7, line 6 at the beginning of that line after 'be' and before 'to said', "afixed" should be changed to ---affixed---.

Signed and Sealed this

Twenty-sixth Day of June, 1990

Attest:

HARRY F. MANBECK, JR.

*Attesting Officer*  *Commissioner of Patents and Trademarks*